(12) United States Patent
Ejima

(10) Patent No.: US 8,908,056 B2
(45) Date of Patent: Dec. 9, 2014

(54) IMAGE RECORDING AND REPRODUCING DEVICE

(75) Inventor: Satoshi Ejima, Tokyo (JP)

(73) Assignee: Nikon Corporation, Tokyo (JP)

( * ) Notice: Subject to any disclaimer, the term of this patent is extended or adjusted under 35 U.S.C. 154(b) by 937 days.

(21) Appl. No.: 12/226,142

(22) PCT Filed: Apr. 13, 2007

(86) PCT No.: PCT/JP2007/058165
§ 371 (c)(1), (2), (4) Date: Aug. 14, 2009

(87) PCT Pub. No.: WO2007/119819
PCT Pub. Date: Oct. 25, 2007

(65) Prior Publication Data
US 2009/0310009 A1 Dec. 17, 2009

(30) Foreign Application Priority Data
Apr. 14, 2006 (JP) .................................. 2006-112026

(51) Int. Cl.
*H04N 5/225* (2006.01)
*H04N 5/222* (2006.01)
*H04N 1/21* (2006.01)
*H04N 5/77* (2006.01)
*H04N 1/00* (2006.01)
*H04N 5/232* (2006.01)
*H04N 5/775* (2006.01)
*H04N 9/79* (2006.01)
*H04N 9/82* (2006.01)
*H04N 101/00* (2006.01)
*H04N 5/907* (2006.01)

(52) U.S. Cl.
CPC ............. *H04N 5/772* (2013.01); *H04N 1/2145* (2013.01); *H04N 5/775* (2013.01); *H04N 9/7921* (2013.01); *H04N 9/8205* (2013.01); *H04N 1/00458* (2013.01); *H04N 2101/00* (2013.01); *H04N 5/907* (2013.01); *H04N 5/23293* (2013.01)

USPC .................................... 348/220.1; 348/333.01

(58) Field of Classification Search
USPC ........... 348/220.1, 211.13; 386/219, 224, 230
See application file for complete search history.

(56) References Cited

U.S. PATENT DOCUMENTS

| 6,115,066 | A | * | 9/2000 | Gowda et al. | .................. 348/308 |
| 6,906,746 | B2 | * | 6/2005 | Hijishiri et al. | ............. 348/240.2 |

(Continued)

FOREIGN PATENT DOCUMENTS

| JP | A-2000-295568 | 10/2000 |
| JP | A-2000-321616 | 11/2000 |

(Continued)

OTHER PUBLICATIONS

Office Action issued in Japanese Application No. 2006-112026 dated Feb. 16, 2012 (with translation).

*Primary Examiner* — Trung Diep
(74) *Attorney, Agent, or Firm* — Oliff PLC

(57) ABSTRACT

An image recording and reproducing device includes: an image sensor that captures an image of a photographic subject; a storage unit that stores captured image data generated by the image sensor; a photography control unit that causes the image sensor to capture an image repeatedly, and causes the storage unit to accumulate the captured image data at a rate of P frames per unit time; a display unit that displays a reproduced image according to the captured data; and a display control unit that sequentially reads out the captured image data accumulated in the storage unit, and causes the display unit to display a reproduced image according to this captured image data that has been read out, at a rate of S frames per unit time that is lower than P frames per unit time.

19 Claims, 5 Drawing Sheets

(56) References Cited

U.S. PATENT DOCUMENTS

| | | | |
|---|---|---|---|
| 7,043,019 B2 * | 5/2006 | Tehranchi et al. | 380/218 |
| 7,136,097 B1 * | 11/2006 | Toyoda et al. | 348/222.1 |
| 7,630,015 B2 * | 12/2009 | Okamura | 348/371 |
| 2004/0239810 A1 | 12/2004 | Takahashi | |
| 2013/0027552 A1 * | 1/2013 | Guzik | 348/143 |

FOREIGN PATENT DOCUMENTS

| | | |
|---|---|---|
| JP | A-2001-211421 | 8/2001 |
| JP | A-2004-221999 | 8/2004 |
| JP | A-2004-312770 | 11/2004 |
| JP | A-2004-357239 | 12/2004 |

* cited by examiner

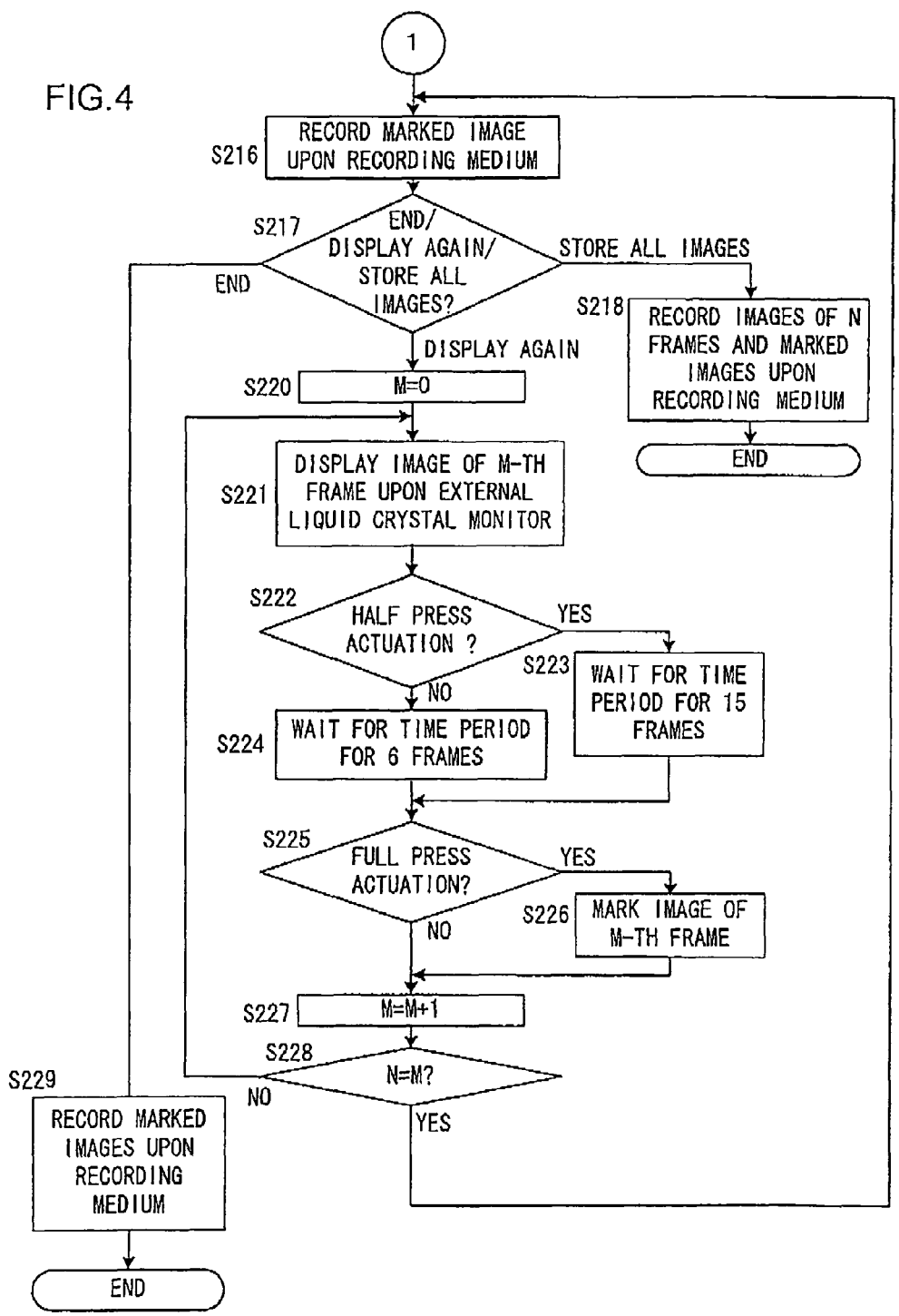

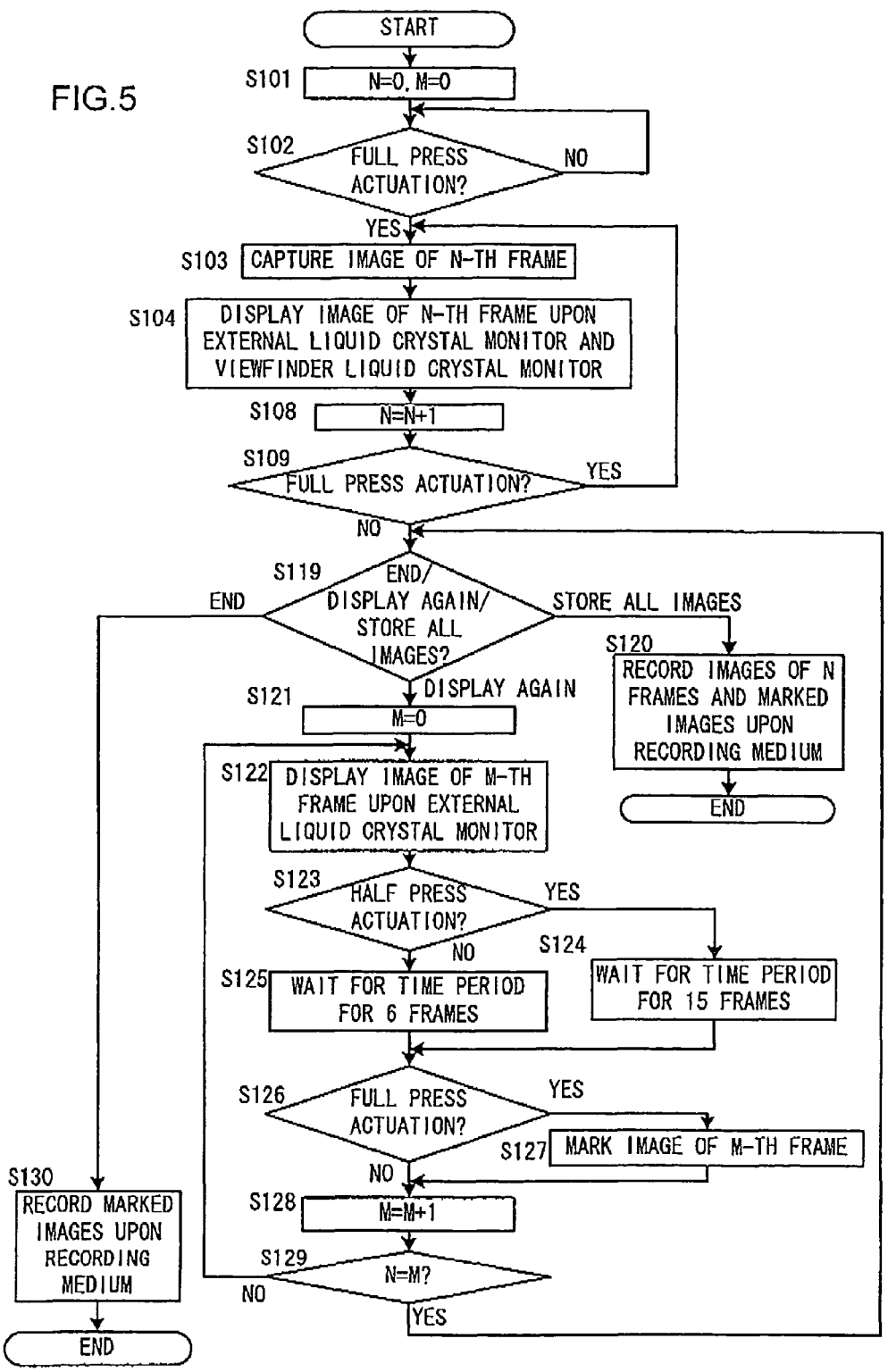

IMAGE RECORDING AND REPRODUCING DEVICE

TECHNICAL FIELD

The present invention relates to a device that records and reproduces photographic images.

BACKGROUND ART

For a photographic subject that is moving quickly, there is a known technique for obtaining a photographic image upon a suitable shooting opportunity. In Patent Reference #1, a technique is disclosed for, during photography of a moving image (video) that consists of a time sequence of still images, adding identification information to a still image at any moment that is ordered.
Patent Reference #1: Japanese Laid-Open Patent Publication 2000-295568.

DISCLOSURE OF THE INVENTION

Problems to be Solved by the Invention

Even with the use of this prior art technique, it is difficult correctly to add the identification information (in other words, to add the identification information to a still image of the photographic subject that has been appropriately shot during photography of the moving image).

Means for Solving the Problems

According to the 1st aspect of the present invention, an image recording and reproducing device, comprises: an image sensor that captures an image of a photographic subject; a storage unit that stores captured image data generated by the image sensor; a photography control unit that causes the image sensor to capture an image repeatedly, and causes the storage unit to accumulate the captured image data at a rate of P frames per unit time; a display unit that displays a reproduced image according to the captured data; and a display control unit that sequentially reads out the captured image data accumulated in the storage unit, and causes the display unit to display a reproduced image according to this captured image data that has been read out, at a rate of S frames per unit time that is lower than P frames per unit time.

According to the 2nd aspect of the present invention, in the image recording and reproducing device according to the 1st aspect, it is preferred that the image recording and reproducing device further comprises a reproduction unit that, according to a command, generates information specifying captured image data corresponding to a reproduced image that is being displayed upon the display unit.

According to the 3rd aspect of the present invention, in the image recording and reproducing device according to the 2nd aspect, it is preferred that the display control unit starts reading out the captured image data from the storage unit, and starts display control of a reproduced image by the display unit, while accumulating the captured image data in the storage unit.

According to the 4th aspect of the present invention, in the image recording and reproducing device according to the 2nd aspect, it is preferred that the display control unit starts reading out the captured image data from the storage unit, and starts display control of a reproduced image by the display unit, after accumulation of the captured image data in the storage unit has ended.

According to the 5th aspect of the present invention, in the image recording and reproducing device according to any one of the 2nd through 4th aspects, it is preferred that the reproduction unit is operated by an actuation signal from a shutter actuation member.

According to the 6th aspect of the present invention, in the image recording and reproducing device according to any one of the 2nd through 5th aspects, it is preferred that the reproduction unit appends information to a header portion of the captured image data corresponding to the reproduced image being displayed, or creates information that is separate from the captured image data, specifying the captured image data corresponding to the reproduced image being displayed.

According to the 7th aspect of the present invention, in the image recording and reproducing device according to any one of the 2nd through 6th aspects, it is preferred that the image recording and reproducing device further comprises a recording control unit that records upon a recording medium only the captured image data that is specified by the information created by the reproduction unit.

According to the 8th aspect of the present invention, in the image recording and reproducing device according to any one of the 2nd through 7th aspects, it is preferred that the display control unit changes a display rate per unit time, according to a display rate change command.

According to the 9th aspect of the present invention, in the image recording and reproducing device according to the 8th aspect, it is preferred that the display rate change command is issued by an actuation signal from a shutter actuation member.

According to the 10th aspect of the present invention, in the image recording and reproducing device according to any one of the 2nd through 9th aspects, it is preferred that: the image recording and reproducing device further comprises a second display unit, separate from the display unit, that displays a reproduced image from the image capture data; and the display control unit further sequentially reads out the captured image data accumulated in the storage unit, and causes the second display unit to display a reproduced image according to this captured image data that has been read out, at the rate of P frames per unit time.

According to the 11th aspect of the present invention, in the image recording and reproducing device according to any one of the 2nd through 10th aspects, it is preferred that when displaying a reproduced image upon the display unit, the display control unit further sequentially reads out from the storage unit captured image data corresponding to a region in the captured image that is commanded in advance, and displays a reproduced image for the region as magnified upon the display unit.

According to the 12th aspect of the present invention, in the image recording and reproducing device according to any one of the 2nd through 11th aspects, the image recording and reproducing device further comprises a prohibition unit that prevents emission of light by a flash device when the photography control unit is controlling photography.

Advantageous Effect of the Invention

With the image recording and reproducing device of the present invention, it is possible reliably to specify the subject image from the data that is repeatedly captured.

BRIEF DESCRIPTION OF THE DRAWINGS

FIG. 4 is a flow chart for explanation of the flow of processing performed by a CPU during the marking mode; and FIG. 5 is a flow chart for explanation of the flow of processing performed by a CPU during the marking mode, in a second embodiment.

BEST MODE FOR CARRYING OUT THE INVENTION

In the following, preferred embodiments for implementation of the present invention will be explained with reference to the drawings.

A First Embodiment

Figure 1:
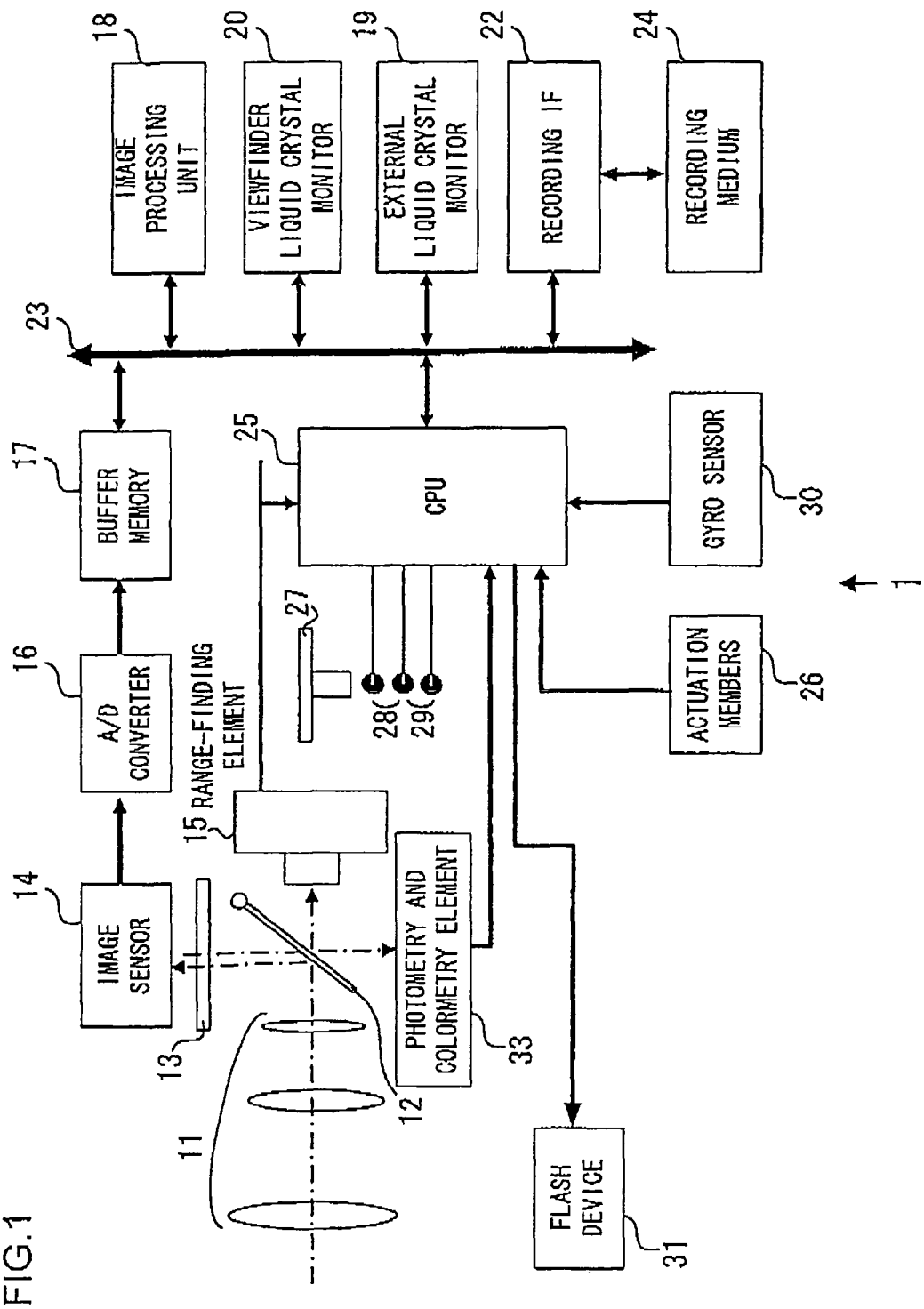
FIG. 1 is a figure for explanation of an electronic camera according to a first embodiment of the present invention.

FIG. 1 is a figure for explanation of an electronic camera 1 according to a first embodiment of the present invention. In FIG. 1, a photographic lens 11 consists of a plurality of lenses. A portion of a ray bundle (light flux) that is collected by the photographic lens 11 is reflected upwards by a half mirror 12 that is disposed upon the optical path. After having passed through a low pass filter 13, this reflected light bundle is lead to an image sensor 14.

On the other hand, the ray bundle that passes through the half mirror 12 is incident upon a range-finding element 15. In each of eleven range-finding regions that are provided within the photographic scene, the range-finding element 15 acquires range-finding information according to the so-called split pupil method (a pair of images that are used for detection of the focus adjustment state of the photographic lens upon the main photographic subject). This range-finding information is sent to a CPU 25.

A photometry and colorimetry element 33 is arranged at a position that opposes the image sensor 14, on the other side of the half mirror 12 therefrom. As described above, the ray bundle that has been reflected upwards by the half mirror 12 is lead to the image sensor 14, but a portion thereof is reflected by the image sensor 14 and proceeds downward, and passes through the halt mirror 12 and is incident upon the photometry and colorimetry element 33.

According to a command sent from the CPU 25, the photometry and colorimetry element 33 detects the amount of light that has passed through the photographic lens 11, and sends a detection signal to the CPU 25. For example, a RGB color filter may be provided to the light receiving section of the photometry and colorimetry element 33, and thus it is adapted to be able to detect the color component ratios of the incident light (so called colorimetry).

The image sensor 14 captures an image of the photographic subject of which image is formed on the imaging area, and outputs a photoelectric conversion signal corresponding to the brightness of this image of the photographic subject. An A/D converter 16 converts this photoelectric conversion signal into a digital signal, and sends the digital data after conversion to a buffer memory 17. The buffer memory 17 is not only used for temporarily storing data before and after image processing and during image processing, but also for storing image files before they are recorded upon a recording medium 24, and for storing image files that have been read out from the recording medium 24.

The CPU 25 inputs signals that are outputted from various blocks and performs predetermined calculations, and outputs control signals to the various blocks on the basis of the results of these calculations. An image processing unit 18 performs image processing upon digital image signals that are stored in the buffer memory 17. This image processing may include, for example, processing for edge enhancement and color temperature adjustment(white balance adjustment), format conversion processing for the image signal, and the like.

Further, the CPU 25 generates display data from the image signal after processing by the image processing unit 18, for displaying the photographic image upon a viewfinder liquid crystal monitor 20 and an external liquid crystal monitor 19. The contents of the display upon the viewfinder liquid crystal monitor 20 are observed via an eyepiece lens (not shown in the figure). The contents of the display upon the external liquid crystal monitor 19 may be directly observed. This viewfinder liquid crystal monitor 20 and external liquid crystal monitor 19 may, for example, consist of VGA image quality displays that are 640 pixels horizontally×480 pixels vertically.

The recording medium 24 consists of a memory card or the like that can be detachably fitted to the electronic camera 1. According to commands from the CPU 25, image files containing data for photographic images and information related thereto may be recorded upon this recording medium 24 via a recording interface (IF) 22. And these image files that have been recorded upon the recording medium 24 may be read out via the recording interface (IF) 22 according to commands from the CPU 25.

The above described CPU 25, buffer memory 17, image processing unit 18, external liquid crystal monitor 19, liquid crystal monitor for viewfinder 20, and recording interface (IF) 22 are all connected together via a data bus 23.

Actuation members 26 include a range ring and a mode changeover control member and the like not shown in the figure, and send actuation signals to the CPU 25 upon being actuated. A half press switch 28 and a full press switch 29 are operated to open and close along with depression actuation of a shutter button 27, and respectively send a half press actuation signal and a full press actuation signal to the CPU 25. A gyro sensor 30 detects angular velocity that represents movement of the electronic camera 1, and outputs a detection signal to the CPU 25. And, according to a command sent from the CPU 25, a flash device 31 emits light and illuminates the main photographic subject.

The Retraction Function

Figure 2:
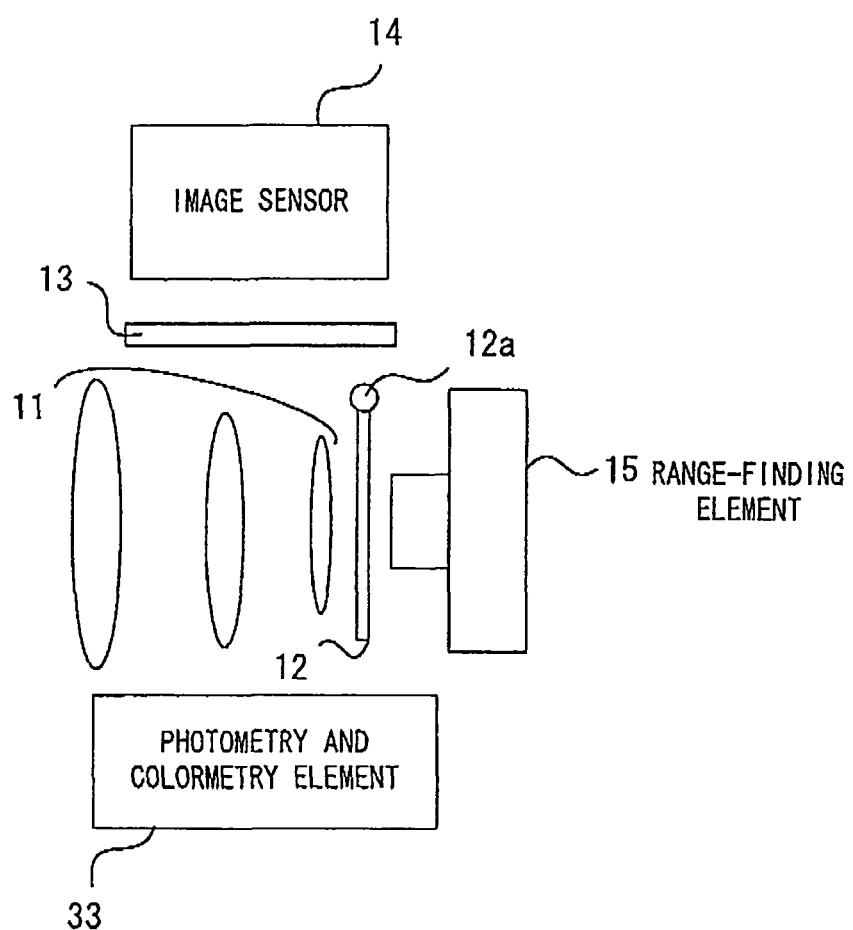
FIG. 2 is a figure for explanation of a photographic optical system when it is retracted.

This electronic camera 1 is endowed with a function of retracting the lens barrel of the photographic lens 11 and receiving it within the chassis. FIG. 2 is a figure for explanation of the photographic optical system while retracted. In FIG. 2, a hinge 12a is provided at one edge of the half mirror 12 and thus the half mirror 12 is configured to be rotatable about this hinge 12a as a center. In the state in which the main switch of the camera (not shown in the figures) is turned ON, the half mirror 12 is driven to the position shown in FIG. 1, while, when the main switch of the camera (not shown in the figures) is turned OFF, the half mirror 12 is driven to the position shown in FIG. 2.

When the half mirror 12 is retracted towards the range-finding element 15 as shown in FIG. 2, the photographic lens 11 is shifted into the space between the low pass filter 13 and the photometry and colorimetry element 33 that is created due to the retraction of the half mirror 12. Due to this, it becomes possible to make the electronic camera 1 more compact when its main switch is OFF.

Since the distance between the half mirror 12 and the range-finding element 15 becomes greater during photography (i.e. when the lens barrel is not retracted), accordingly, even if dust or the like attaches to the half mirror 12, there is no fear that this attached dust may exert any influence upon the range-finding process. Moreover, since the half mirror 12 is built so as to rotate about the hinge 12a as a center, accordingly the possibility of dust or the like becoming attached to the range-finding element 15 during rotation of the half mirror 12 is small.

Correspondence Between the Viewfinder Magnified Display and the Range-Finding Region The image sensor 14 may have, for example, 8,000,000 pixels upon its photographic imaging area. This electronic camera 1 is adapted to be able to read out (take in), from the image sensor 14, an image signal having this maximum of 8,000,000 pixels at the rate of 30 frames per second. However, during normal display when the electronic camera 1 is displaying the entire area of the photographic image upon the viewfinder liquid crystal monitor 20 at VGA image quality, it would also be acceptable for a signal that does not include all of these 8,000,000 pixels to be read out. In this case, the CPU 25 may economize upon electrical power by reducing the pulse rate of the signal that drives the image sensor 14, so as to read out a signal that is compatible with 640 pixels horizontally×480 pixels vertically at the rate of 30 frames per second from the image sensor 14.

When one partial region of the photographic image is being displayed by being extracted and magnified onto the screen of the viewfinder liquid crystal monitor 20 (so called magnified display), the CPU 25 raises the pulse rate of the signal that drives the image sensor 14, so as to read out the above described 8,000,000 pixels image signal at the rate of 30 frames per second. And, when an actuation signal is inputted from the range ring of the photographic lens 11, the CPU 25 not only increases the pulse rate of that drive signal, but also displays an image, from the image signal that has been read out from the image sensor 14 at this higher pulse rate, that corresponds to the range-finding region that is selected at that time point (an image that consists of 640 pixels horizontally× 480 pixels vertically, and that includes the range-finding region) upon the viewfinder liquid crystal monitor 20. It should be understood that the entire area of the photographic image may be displayed upon the external liquid crystal monitor 19 at 640 pixels horizontally×480 pixels vertically by the image signal that has been read out at the higher pulse rate being thinned down or the like by a predetermined ratio.

Continuous Shooting and Light Emission by the Flash Device

As described above, if the half mirror 12 is driven to the position shown in FIG. 1, the photometry and colorimetry element 33 can perform photometry, irrespective of whether the image sensor 14 is capturing an image or not. Accordingly, if a configuration is provided in which image capture by the image sensor 14 and photometry are performed in parallel, then it becomes possible to detect the change in the amount of light of the photographic subject in real time during image capture, and it becomes possible to take action to change the exposure time period or the like according to this amount of light change.

By performing photometry in parallel with capturing an image with the image sensor 14, it is possible to control the amount of light emitted by the flash device 31 while monitoring the amount of light upon the photographic subject in real time while the image is being captured. As a result, in order to determine the amount of light emitted from the flash device 31, it is possible to manage without performing the operation of, in a preparatory episode before photography (so called pre-flash), causing the flash device 31 to emit light and detecting the amount of light reflected back from the photographic subject; and therefore, along with reducing the consumption of electrical power by the flash device 31, it also becomes possible to enhance the speed of continuous shooting during continuous shooting photography using the flash device 31.

Continuous Shooting and RAW Data

This electronic camera 1 is configured so as it becomes possible to select the mode in which the digital data is recorded upon the recording medium as RAW data before image processing. If continuous shooting is performed in the RAW data recording mode, then the CPU 25 stores the image data that has been acquired during the series of continuously shot photographs all together in a predetermined folder within the buffer memory 17.

Moreover, after the continuous shooting has ended, the CPU 25 performs image processing only upon one of the images within the above described predetermined folder (for example, upon the image for the first frame that has been continuously shot), and determines adjustment values such as white balance, tone, edge enhancement, and the like. And the CPU 25 records the continuous shooting image data within the above described predetermined folder upon the recording medium 24 in correspondence with information that specifies the above described adjustment values for image processing.

Generally, with images that have been acquired during a continuous shooting series, it is unusual for the illumination conditions of the photographic subject to change greatly. Due to this, if parameters (adjustment values for image processing) are obtained for appropriately processing one frame of a set of continuously shot images, then, even if some other image included in the continuously shot sequence of images is used for image processing, still the possibility is high that image processing can be performed in an appropriate manner. Thus, in this embodiment, image processing parameters are determined for only one frame that is representative of the continuously shot sequence of images, and these are stored in correspondence to the continuously shot sequence of images.

Recording Together, and Slow Reproduction and Marking

Figure 3:
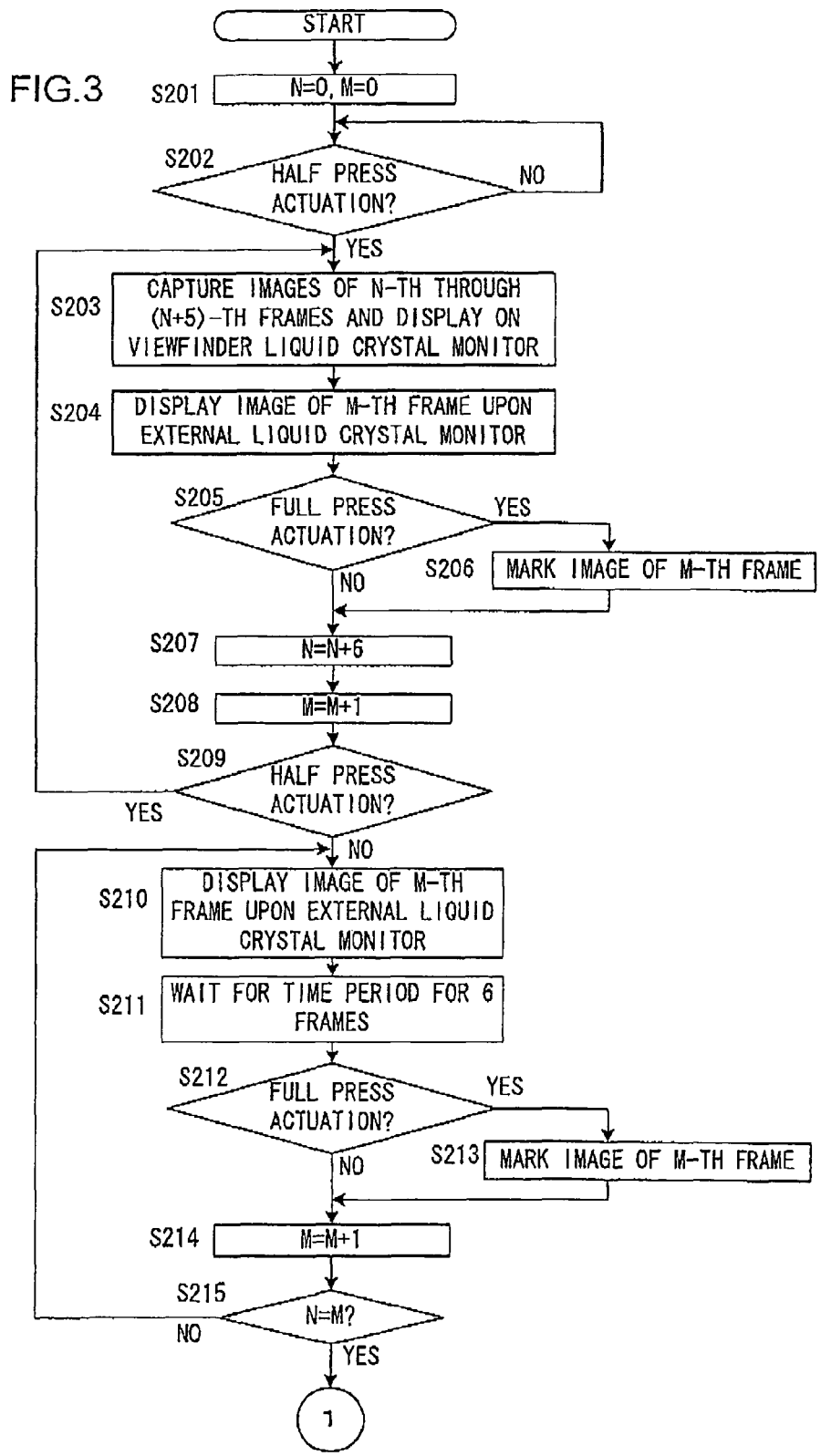
FIG. 3 is a flow chart for explanation of the flow of processing performed by a CPU during a marking mode.

The electronic camera 1 according to this embodiment is also configured so as it becomes possible to select an operational mode (termed the "marking mode #1") in which identification information is appended to the images that make up a continuously shot sequence of images. In concrete terms, the photographed image is displayed while being reproduced slowly at a frame rate that is slower than during photography while the moving image is being photographed, and, according to a marking command, information is created that specifies an image in this reproduced display FIG. 3 is a flow chart for explanation of the flow of processing performed by the CPU 25 when the marking mode #1 has been selected. The CPU 25 starts the processing shown in FIG. 3 when an actuation signal is inputted from the actuation members 26 to select the marking mode #1.

In a step S201, the CPU 25 resets a parameter N and a parameter M to 0, and then the flow of control proceeds to a step S202. The parameter N and the parameter M are used as counters for counting the frames of a moving image. In the step S202, the CPU 25 makes a decision as to whether or not. the shutter button 27 has been half press actuated. If an actuation signal has been inputted from the half press switch 28, then the CPU 25 reaches an affirmative decision in this step S202 and the flow of control proceeds to a step S203, whereas if no actuation signal has been inputted from the half press switch 28, then the CPU 25 reaches a negative decision in this step S202, and the above decision processing is repeated.

Such half press actuation corresponds to a start command for continuous shooting. In the step S203, the CPU 25 captures and stores in the buffer memory 17 six image frames, from the Nth frame to the (N+5)-th frame and continuously displays these photographed images that have been captured upon the viewfinder liquid crystal monitor 20, and then the flow of control proceeds to a step S204. Here, it is supposed that the rate at which these photographic images are shot is 30 frames per second, and that they are displayed upon the viewfinder liquid crystal monitor 20 as moving video at a display rate of the same 30 frames per second.

In the step S204, the CPU 25 displays the photographic image for the M-th frame upon the external liquid crystal monitor 19, and then the flow of control proceeds to a step S205. Since the reproduced display upon the external liquid crystal monitor 19 is displayed at the proportion of one frame for every 6 frames of the photographed images, accordingly the display rate of the moving image upon the external liquid crystal monitor 19 is 5 frames per second. By providing a display in this manner, if the photographer observes the viewfinder liquid crystal monitor 20, then it is possible for him to track after a photographic subject that is moving. Moreover, if the photographer observes the external liquid crystal monitor 19, as opposed to the display contents of the viewfinder liquid crystal monitor 20, then it is possible for him to observe a photographic subject that is shifting slowly and sluggishly.

In the step S205, the CPU 25 makes a decision as to whether or not the shutter button 27 has been full press actuated. If an actuation signal has been inputted from the full press switch 29, then the CPU 25 reaches an affirmative decision in this step S205 and the flow of control proceeds to a step S206, whereas if no actuation signal has been inputted from the full press switch 29, then the CPU 25 reaches a negative decision in this step S205, and the flow of control is transferred to a step S207.

In the step S206, the CPU 25 performs marking upon the image of the M-th frame, and then the flow of control proceeds to the step S207. This marking may be performed, for example, by setting to "1" a predetermined flag in the header portion of the image file that corresponds to the frame being displayed upon the external liquid crystal monitor 19 at the time point that full press actuation was performed.

In the step S207, the CPU 25 adds 6 to the parameter N, and then the flow of control proceeds to a step S208. In this step S208, the CPU 25 adds 1 to the parameter M, and then the flow of control proceeds to a step S209.

In the step S209, the CPU 25 makes a decision as to whether or not the half press actuation of the shutter button 27 is being continued. If an actuation signal is being inputted from the half press switch 28, then the CPU 25 reaches an affirmative decision in this step S209 and the flow of control returns to the step S203, whereas if no actuation signal is being inputted from the half press switch 28, then the CPU 25 reaches a negative decision in this step S209, and the flow of control proceeds to a step S210. If the flow of control returns to the step S203 then it is the case that the continuous shooting command is being continued, and, as explained above, the continuous shooting photography (repetitive processing to storage digitized image data in the buffer memory 17, and accumulation of image data in the buffer memory 17) and the slow reproduction of the display of a moving image are repeated.

Cancellation of the half press actuation corresponds to a continuous shooting termination command. In the step S210, the CPU 25 displays the M-th photographic image upon the external liquid crystal monitor 19, and then the flow of control proceeds to a step S211. And, in a similar manner to the case in the step S204, the photographic images in the buffer memory 17 are displayed upon the external liquid crystal monitor 19 as being reproduced slowly. In the step S211, the CPU 25 waits for a time interval corresponding to 6 frames, and then the flow of control proceeds to a step S212. This waiting time for 6 frames corresponds to the time period necessary for continuous shooting photography of six frames. Due to this, the photographic images that are accumulating within the buffer memory 17 and have not yet been reproduced and displayed upon the external liquid crystal monitor 19 are reproduced slowly.

In the step S212, the CPU 25 makes a decision as to whether or not the shutter button 27 has been full press actuated. If an actuation signal is being inputted from the full press switch 29, then the CPU 25 reaches an affirmative decision in this step S212 and the flow of control proceeds to a step S213, whereas if no actuation signal is being inputted from the full press switch 29, then the CPU 25 reaches a negative decision in this step S212, and the flow of control proceeds to a step S214.

In the step S213, the CPU 25 performs marking upon the M-th frame, and then the flow of control proceeds to the step S214. The marking is performed in the same manner as in the step S206. And in the step S214, the CPU 25 adds 1 to the parameter M, and then the flow of control proceeds to a step S215.

In the step S215, the CPU 25 makes a decision as to whether or not N=M. If N=M is valid then the CPU 25 reaches an affirmative decision in this step S215 and the flow of control proceeds to a step S216 of FIG. 4, whereas if N=M is not valid then the CPU 25 reaches a negative decision in this step S215 and the flow of control returns to the step S210. If the flow of control proceeds to the step S216, then it is the case that all of the photographic images that have been accumulated in the buffer memory 17 have been displayed by being slowly reproduced upon the external liquid crystal monitor 19. But, if the flow of control returns to the step S210, then it is the case that, among the photographic images that have been accumulated in the buffer memory 17, there is some image that has not yet been reproduced upon the external liquid crystal monitor 19.

In the step S216 of FIG. 4, the CPU 25 records upon the recording medium 24, among the images that are being accumulated in the buffer memory 17, only that image that has been marked, and then the flow of control proceeds to a step S217. The marked image is that one for which the above described predetermined flag in the header portion of the image file is set to "1".

In the step S217, the CPU 25 makes a decision as to whether or not to end processing/to display images again/to store all of the data in the buffer memory 17. The CPU 25 makes this decision based upon an actuation signal from the actuation members 26.

If the CPU 25 has decided upon "display again", then the flow of control is transferred to a step S220. In this step S220, the CPU 25 resets the parameter M to 0, and then the flow of control proceeds to a step S221. In this step S221, the CPU 25 displays the photographic image of the M-th frame upon the external liquid crystal monitor 19, and then the flow of control proceeds to a step S222. And, in a similar manner to the case with the step S210, the photographic images in the buffer memory 17 are reproduced and displayed upon the external liquid crystal monitor 19.

In the step S222, the CPU 25 makes a decision as to whether or not the shutter button 27 has been half press actuated. If an actuation signal is being inputted from the half press switch 28, then the CPU 25 reaches an affirmative decision in this step S222 and the flow of control proceeds to a step S223, whereas if no actuation signal is being inputted from the half press switch 28, then the CPU 25 reaches a negative decision in this step S222, and the flow of control proceeds to a step S224.

In the step S223, the CPU 25 waits for a time interval corresponding to 15 frames, and then the flow of control proceeds to a step S225. This waiting time for 15 frames corresponds to the time period necessary for continuous shooting photography of fifteen frames. Due to this, the display rate at which slow reproduction is performed upon the external liquid crystal monitor 19 is further slowed down to 2 frames per second.

And in the step S224, the CPU 25 waits for a time interval corresponding to 6 frames, and then the flow of control proceeds to the step S225. In this case, the slow reproduction display rate upon the external liquid crystal monitor 19 is maintained at 5 frames per second. It should be understood that, even during the slow reproduction display upon the external liquid crystal monitor 19, it is configured for images to be captured by the image sensor 14 in real time, and for images reproduced from the data that is captured by the image sensor 14 to be displayed upon the viewfinder liquid crystal monitor 20.

In the step S225, the CPU 25 makes a decision as to whether or not the shutter button 27 has been full press actuated. If an actuation signal is being inputted from the full press switch 29, then the CPU 25 reaches an affirmative decision in this step S225 and the flow of control proceeds to a step S226, whereas if no actuation signal is being inputted from the full press switch 29, then the CPU 25 reaches a negative decision in this step S225, and the flow of control proceeds to a step S227.

In the step S226, the CPU 25 performs marking upon the M-th frame, and then the flow of control proceeds to the step S227. The marking is performed in the same manner as in the step S206. And in the step S227, the CPU 25 adds 1 to the parameter M, and then the flow of control proceeds to a step S228.

In the step S228, the CPU 25 makes a decision as to whether or not N=M. If N=M is valid then the CPU 25 reaches an affirmative decision in this step S228 and the flow of control returns to the step S216, whereas if N=M is not valid then the CPU 25 reaches a negative decision in this step S228 and the flow of control returns to the step S221. If the flow of control returns to the step S216, then it is the case that all of the photographic images that have been accumulated in the buffer memory 17 have been displayed again upon the external liquid crystal monitor 19. But, if the flow of control returns to the step S210, then it is the case that, among the photographic images that have been accumulated in the buffer memory 17, there is some image that has not yet been displayed again upon the external liquid crystal monitor 19.

If, in the step S217 described above, the CPU 25 has decided upon "store all images", then the flow of control is transferred to a step S218. In this step S218, the CPU 25 records image files for all of the images that are accumulated in the buffer memory 17 (including files for the marked images) upon the recording medium 24, and then the processing of FIG. 4 terminates. Since the files for the marked images include identification information (to which corresponds the flag described above), accordingly, when choosing a file for a marked image from the plurality of image files, it is possible to utilize them as book marks. Moreover, the accumulated data in the buffer memory 17 is not stored.

If, in the step S217 described above, the CPU 25 has decided upon "end", then the flow of control is transferred to a step S229. In this step S229, among the images that are accumulated in the buffer memory 17, the CPU 25 only records upon the recording medium 24 those images that are marked, and then the processing shown in FIG. 4 terminates. If no files for marked images are present, then nothing is recorded upon the recording medium 24. Moreover, the accumulated data in the buffer memory 17 is not stored.

If, in the step S217 described above, the CPU 25 has decided upon "redisplay" again, then the CPU 25 repeats the processing of the steps S220 through S228. If a marking command is again issued for an image that has previously been marked, then, in this embodiment, this already existing identification information is left as it is, and resetting of the identification information is not performed.

According to the first embodiment as explained above, the following operational benefits are obtained (1) Since, while accumulating the photographed images in the buffer memory 17 at 30 frames per second, simultaneously the accumulated images are slowly reproduced upon the external liquid crystal monitor 19 at 5 frames per second, accordingly if it is desired, for example, to mark the image of a frame that has been taken at the instant of a goal in an F1 race, or the like, then it is possible to issue a marking command during photography (by full press actuating the shutter button 27) while checking the slow motion image. Due to this, it is possible reliably to specify the subject image that is to be marked, and to create identification information for it.

(2) Since it is arranged to record upon the recording medium 24 only files for those images denoted by the identification information that has been created, and not to store the accumulated data in the buffer memory 17 (in the step S216 and the step S229), accordingly it is possible to economize upon the capacity of the recording medium 24 that is used, as compared to the case of recording all of the images upon the recording medium 24.

(3) Since it is arranged to issue the marking command for creating the identification information by using the shutter button 27 (in the steps S206, S213, and S226), accordingly there is no sense of discomfort, as with normal photographic operation, and thus the convenience of use is good.

(4) Since it is made possible (in the step S222) to select the speed for slow reproduction to either 2 frames per second or 5 frames per second, accordingly it becomes even simpler to specify the subject image that is to be marked.

(5) Since it is arranged for the selection command for the speed of slow reproduction to be issued by using the shutter button 27 (in the step S222), accordingly there is no sense of discomfort, as with normal photographic operation, and thus the convenience of use is good.

Variant Embodiment #1

It would also be acceptable to arrange for it to be possible, in the state in which the images that are accumulated in the buffer memory 17 are being slowly reproduced upon the external liquid crystal monitor 19, to perform frame advance and frame return among the images that are being slowly reproduced, according to an actuation signal from a dial member (not shown in the figures) included among the actuation members 26.

Variant Embodiment #2

It would also be acceptable to provide a configuration with which, during slow reproduction, a partial region of the photographic image centered upon a spot that is commanded in advance may be displayed upon the screen of the external liquid crystal monitor 19 as pulled out and extended (i.e. as a magnified display). In this case, it would be desirable for a common region to be displayed as magnified, for all of the photographic image frames that are being slowly reproduced. Moreover, it would also be acceptable to exchange the contents displayed on the viewfinder liquid crystal monitor 20 described above for the contents displayed on the external liquid crystal monitor 19 described above, and vice versa.

Variant Embodiment #3

Although, as an example of the creation of the identification information, the method of using a header flag in the file has been shown, it would also be acceptable to provide a configuration in which information that specifies the file name of a subject image that is to be marked, or that specifies a storage location for that file, is recorded in a management file that is different from the image data file, and this file for management is treated as being the identification information.

A Second Embodiment

This electronic camera 1 is adapted to be able also to select another operational mode (termed the "marking mode #2") in which identification information is appended to the images that constitute the continuously shot series of images. In concrete terms, after having photographed a moving image, the photographed image is reproduced and displayed slowly at a frame rate that is slower than when it was photographed, and, according to a marking command, information is created that specifies an image in this reproduced display.

FIG. 5 is a flow chart for explanation of the flow of processing performed by the CPU 25 when the marking mode #2 has been selected. The CPU 25 starts the processing shown in FIG. 5 when an actuation signal for selection of the marking mode #2 is inputted from the actuation members 26.

In a step S101, the CPU 25 resets the parameter N and the parameter M to 0, and then the flow of control proceeds to a step S102. The parameter N and the parameter M are used as counters for counting the frames of the moving image. In the step S102, the CPU 25 makes a decision as to whether or not the shutter button 27 has been full press actuated. If an actuation signal is being inputted from the full press switch 29, then the CPU 25 reaches an affirmative decision in this step S102 and the flow of control proceeds to a step S103, whereas if no actuation signal is being inputted from the full press switch 29, then the CPU 25 reaches a negative decision in this step S102, and the above decision processing is repeated.

Full press actuation corresponds to a continuous shooting start command. In the step S103, the CPU 25 captures and stores the image of the N-th frame in the buffer memory 17, and then the flow of control proceeds to a step S104. Here, the rate at which the photographic images are captured is supposed to be 30 frames per second.

In the step S104, the CPU 25 displays the photographic image of the N-th frame upon the external liquid crystal monitor 19 and the viewfinder liquid crystal monitor 19, and then the flow of control is transferred to a step S108. The display rate for the moving image is the same as the capture rate, i.e. 30 frames per second. And in the step S108 the CPU 25 adds 1 to the parameter N, and then the flow of control proceeds to a step S109.

In the step S109, the CPU 25 makes a decision as to whether or not the shutter button 27 is continuing to be full press actuated. If an actuation signal continues to be inputted from the full press switch 29, then the CPU 25 reaches an affirmative decision in this step S109 and the flow of control returns to the step S103, whereas if an actuation signal is not being inputted from the full press switch 29, then the CPU 25 reaches a negative decision in this step S109, and the flow of control proceeds to a step S119.

The release of full press actuation corresponds to a continuous shooting end command. Since the processing of the steps S119 through S130 is the same as that of the steps S217 through S229 of FIG. 4, accordingly explanation thereof will be curtailed. According to this second embodiment, it is possible to issue slow reproducing display and marking commands after the continuous shooting has ended.

According to the second embodiment as explained above, the following operational benefits are obtained.

(1) Since it is arranged to accumulate the photographic images in the buffer memory 17 at 30 frames per second, and to slowly reproduce the accumulated images upon the external liquid crystal monitor 19 after the continuous shooting end command has been issued, accordingly it is possible to concentrate upon the operation of photography during continuous shooting, in order to ensure that the photographic subject does not escape (2) Since the images that are accumulated in the buffer memory 17 are slowly reproduced upon the external liquid crystal monitor 19 after the continuous shooting end command has been issued (i.e. after a negative decision has been reached in the step S109), accordingly it is possible to issue a marking command (by full press actuation of the shutter button 27) while checking the slow motion image, in a similar manner to the case with the first embodiment. As a result, it is possible reliably to specify the subject image that is to be marked, and to create the identification information.

Variant Embodiment #4

In the marking mode #1 and the marking mode #2, it is desirable for light emission by the flash device 31 to be prohibited. Thus, the CPU 25 does not cause the flash device 31 to emit light when the marking mode #1 or the marking mode #2 has been selected. By doing this, it is possible to prevent images that have been shot with the flash device 31 emitting light, and images that have been shot with the flash device 31 not emitting light, being mixed together in the series of images that make up the continuous shooting image during the marking mode.

Although various embodiments and variant embodiments have been explained in the above description, the present invention is not to be considered as being limited by the details thereof. Other modes that are considered to fall within the range of the technical concept of the present invention are also included within the scope of the present invention.

The contents of the disclosure of the following patent application, upon which priority is claimed, are hereby incorporated herein by reference:

Japanese Patent Application 2006-112026 (filed on Apr. 14, 2006).

The invention claimed is:

1. An image recording and reproducing device, comprising:
an image sensor that captures an image of a photographic subject;
a photography control unit that causes the image sensor to capture an image repeatedly at a rate of P frames per unit time;
a first storage unit that stores a plurality of images captured by the image sensor;
a display unit that displays a reproduced image according to the captured image;
a display control unit that sequentially reads out from the first storage unit the plurality of captured images stored in the first storage unit, and causes the display unit to sequentially display a reproduced image according to the plurality of captured images that have been read out, at a rate of S frames per unit time that is lower than P frames per unit time;
a second storage unit that, according to a command from a user while the reproduced image of the plurality of captured images is sequentially being displayed, stores a captured image designated by the command out of the plurality of images stored in the first storage unit.

2. An image recording and reproducing device, comprising:
- an image sensor that captures an image of a photographic subject;
- a photography control unit that causes the image sensor to capture an image repeatedly at a rate of P frames per unit time;
- a first storage unit that stores plurality of images captured by the image sensor;
- a display unit that displays a reproduced image according to the captured image;
- a display control unit that sequentially reads out from the first storage unit the plurality of captured images stored in the first storage unit, and causes the display unit to sequentially display a reproduced image according to the plurality of captured images that have been read out, at a rate of S frames per unit time that is lower than P frames per unit time;
- a reproduction unit that, when there is a command from a user while the reproduced image is being displayed, generates information showing that there has been the command, in a captured image corresponding to the reproduced image; and
- a second storage unit that stores the captured image designated by the command out of the plurality of captured images stored in the first storage unit with the generated information.

3. An image recording and reproducing device according to claim 2, wherein:
the display control unit sequentially reads out the plurality of captured images from the first storage unit, and starts display control of a reproduced image by the display unit, while accumulating the plurality of captured images in the first storage unit.

4. An image recording and reproducing device according to claim 2, wherein:
the display control unit reads out the plurality of captured images from the first storage unit, and starts display control of a reproduced image by the display unit, after accumulation of the plurality of captured images in the first storage unit has ended.

5. An image recording and reproducing device according to claim 2, wherein:
the reproduction unit is operated by an actuation signal from a shutter actuation member.

6. An image recording and reproducing device according to claim 2, wherein:
the reproduction unit appends information to a header portion of the captured image corresponding to the reproduced image being displayed, or creates information that is separate from the captured image, specifying the captured image corresponding to the reproduced image being displayed.

7. An image recording and reproducing device according to claim 2, further comprising:
a recording control unit that records in the second storage unit the captured image that is specified by the information created by the reproduction unit.

8. An image recording and reproducing device according to claim 2, wherein:
the display control unit changes a display rate per unit time, according to a display rate change command.

9. An image recording and reproducing device according to claim 8, wherein:
the display rate change command is issued by an actuation signal from a shutter actuation member.

10. An image recording and reproducing device according to claim 2, further comprising:
- a second display unit, separate from the display unit, that displays a reproduced image from the captured image, and wherein
- the display control unit further sequentially reads out the plurality of captured images accumulated in the first storage unit, and causes the second display unit to display a reproduced image according to the captured image that has been read out, at the rate of P frames per unit time.

11. An image recording and reproducing device according to claim 2, wherein:
when displaying a reproduced image upon the display unit, the display control unit further sequentially reads out from the first storage unit the plurality of captured images corresponding to a region in the captured image that is commanded in advance, and displays a reproduced image for the region as magnified upon the display unit.

12. An image recording and reproducing device according to claim 2, further comprising:
a prohibition unit that prevents emission of light by a flash device when the photography control unit is controlling photography.

13. An image recording and reproducing device according to claim 1, further comprising:
a recording control unit that records in the second storage unit all the plurality of captured images that are stored in the first storage unit.

14. An image recording and reproducing device according to claim 1, further comprising:
a recording control unit that, when there is a command from a user while the reproduced image is displayed, records in the second storage unit the captured image corresponding to the reproduced image.

15. An image recording and reproducing device according to claim 1, wherein:
the display control unit sequentially reads out the plurality of captured images from the first storage unit, and starts display control of a reproduced image by the display unit, while accumulating the plurality of captured images in the first storage unit.

16. An image recording and reproducing device according to claim 1, wherein:
the display control unit reads out the plurality of captured images from the first storage unit, and starts display control of a reproduced image by the display unit, after accumulation of the plurality of captured images in the first storage unit has ended.

17. An image recording and reproducing device according to claim 1, further comprising:
- a second display unit, separate from the display unit, that displays a reproduced image from the captured image, and wherein
- the display control unit further sequentially reads out the captured image data accumulated in the first storage unit, and causes the second display unit to display a reproduced image according to the captured image that has been read out, at the rate of P frames per unit time.

18. An image recording and reproducing device according to claim 1, wherein:
when displaying a reproduced image upon the display unit, the display control unit further sequentially reads out from the first storage unit the plurality of captured images corresponding to a region in the captured image that is commanded in advance, and displays a reproduced image for the region as magnified upon the display unit.

19. The image recording and reproducing device according to claim 1, further comprising:
a control unit that receives the command from the user while the reproduced image according to the plurality of captured images is sequentially being displayed at the rate of S frames per unit time that is lower than P frames per unit time.

* * * * *